(12) United States Patent
Reichmuth et al.

(10) Patent No.: US 10,758,899 B2
(45) Date of Patent: Sep. 1, 2020

(54) ELECTRONIC DOSING DRIVE

(71) Applicant: Eppendorf AG, Hamburg (DE)

(72) Inventors: Burkhardt Reichmuth, Hamburg (DE);
Marc Wilth, Hamburg (DE); Jörg Sattler, Hamburg (DE)

(73) Assignee: Eppendorf AG, Hamburg (DE)

( * ) Notice: Subject to any disclaimer, the term of this patent is extended or adjusted under 35 U.S.C. 154(b) by 291 days.

(21) Appl. No.: 15/972,806

(22) Filed: May 7, 2018

(65) Prior Publication Data

US 2018/0318825 A1 Nov. 8, 2018

(30) Foreign Application Priority Data

May 5, 2017 (EP) .................................... 17169764

(51) Int. Cl.
*B01L 3/02* (2006.01)
*F16H 25/24* (2006.01)

(52) U.S. Cl.
CPC ............ *B01L 3/0227* (2013.01); *F16H 25/24* (2013.01); *B01L 3/0289* (2013.01); *F16H 2025/249* (2013.01); *F16H 2025/2481* (2013.01)

(58) Field of Classification Search
None
See application file for complete search history.

(56) References Cited

U.S. PATENT DOCUMENTS

| | | | | |
|---|---|---|---|---|
| 4,098,125 A | * | 7/1978 | Lee ....................... | B01L 3/0224 422/925 |
| 4,256,153 A | * | 3/1981 | Lamaziere ............ | B01L 3/0227 141/238 |
| 4,865,591 A | * | 9/1989 | Sams ................ | A61M 5/31553 604/186 |

(Continued)

FOREIGN PATENT DOCUMENTS

DE        1053883        3/1959
DE    10 2015 212 448    1/2017
(Continued)

OTHER PUBLICATIONS

Notice of Reasons for Refusal dated Feb. 12, 2020, JP Patent Application No. 2018-088809.

*Primary Examiner* — Jill A Warden
*Assistant Examiner* — Brittany I Fisher
(74) *Attorney, Agent, or Firm* — Vidas, Arrett & Steinkraus, P.A.

(57) ABSTRACT

An electronic dosing drive comprising a support structure, a threaded spindle with an external thread for driving a plunger, at least one first guide element is firmly connected, and is guided parallel to the threaded spindle on a second guide element, a spindle nut having an internal thread is engaged with the external thread of the threaded spindle, an electric drive motor having a motor shaft is coupled with the spindle nut and is attached to the support structure, an electric control apparatus is connected to the electric drive motor, where the external thread of the threaded spindle has (Continued)

multiple threaded areas that are separated from each other by first flattenings on their circumference extending in the longitudinal direction, and the first flattenings have guide areas that abut the core diameter of the internal thread of the spindle nut.

17 Claims, 11 Drawing Sheets

(56) References Cited

U.S. PATENT DOCUMENTS

| | | | | |
|---|---|---|---|---|
| 5,611,783 | A * | 3/1997 | Mikkelsen | A61M 5/24 604/208 |
| 5,820,602 | A * | 10/1998 | Kovelman | A61M 5/172 604/187 |
| 7,858,041 | B2 * | 12/2010 | Muraishi | B01L 3/021 422/511 |
| 8,905,971 | B2 * | 12/2014 | Marshall | A61M 5/20 604/135 |
| 9,044,549 | B2 * | 6/2015 | Niklasson | A61M 5/31586 |
| 2002/0120235 | A1 * | 8/2002 | Enggaard | A61M 5/31553 604/135 |
| 2004/0099067 | A1 * | 5/2004 | Chen | B01L 3/0227 73/863.32 |
| 2004/0166027 | A1 | 8/2004 | Wilmer et al. | |
| 2005/0247141 | A1 | 11/2005 | Belgardt et al. | |
| 2009/0071267 | A1 * | 3/2009 | Mathus | B01L 3/0279 73/864.14 |
| 2013/0291660 | A1 * | 11/2013 | Wilmer | B01L 3/0224 73/864.13 |
| 2014/0010732 | A1 * | 1/2014 | Belgardt | B01L 3/0217 422/501 |
| 2015/0133874 | A1 * | 5/2015 | Butler | A61M 5/31515 604/223 |
| 2016/0296709 | A1 * | 10/2016 | Blancke | A61M 5/31535 |
| 2016/0310937 | A1 * | 10/2016 | Lind | G01F 11/029 |
| 2019/0027878 | A1 * | 1/2019 | Wolf | H01R 12/714 |

FOREIGN PATENT DOCUMENTS

| | | |
|---|---|---|
| EP | 0656229 | 6/1995 |
| EP | 1449586 | 8/2004 |
| JP | S63-34361 | 2/1988 |
| JP | 2002537981 A | 11/2002 |
| JP | 3097201 U | 8/2003 |
| JP | 2005337967 A | 12/2005 |
| WO | 2016001010 A1 | 1/2016 |
| WO | 2017/001127 A1 | 1/2017 |
| WO | 2017/129179 | 8/2017 |

* cited by examiner

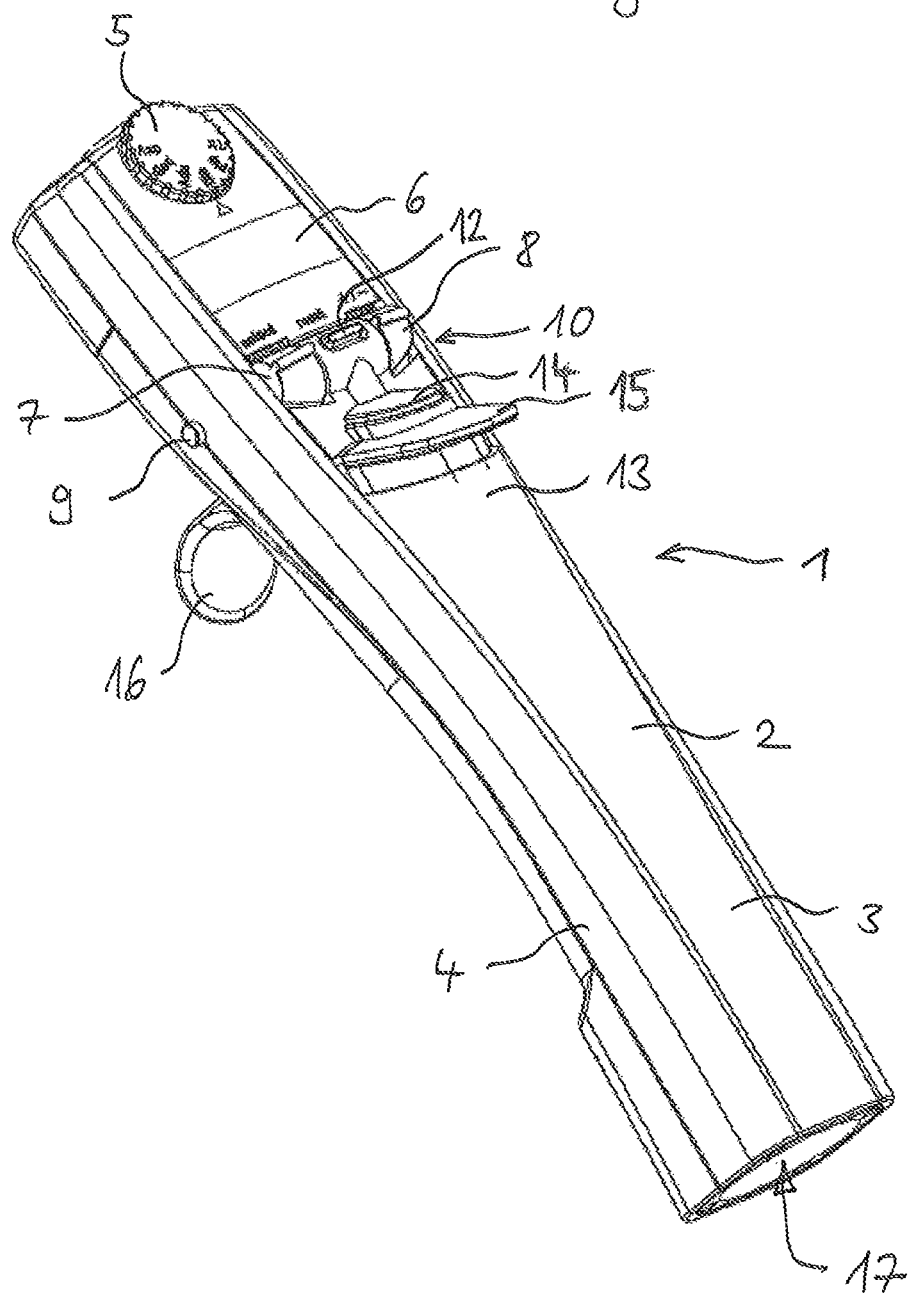

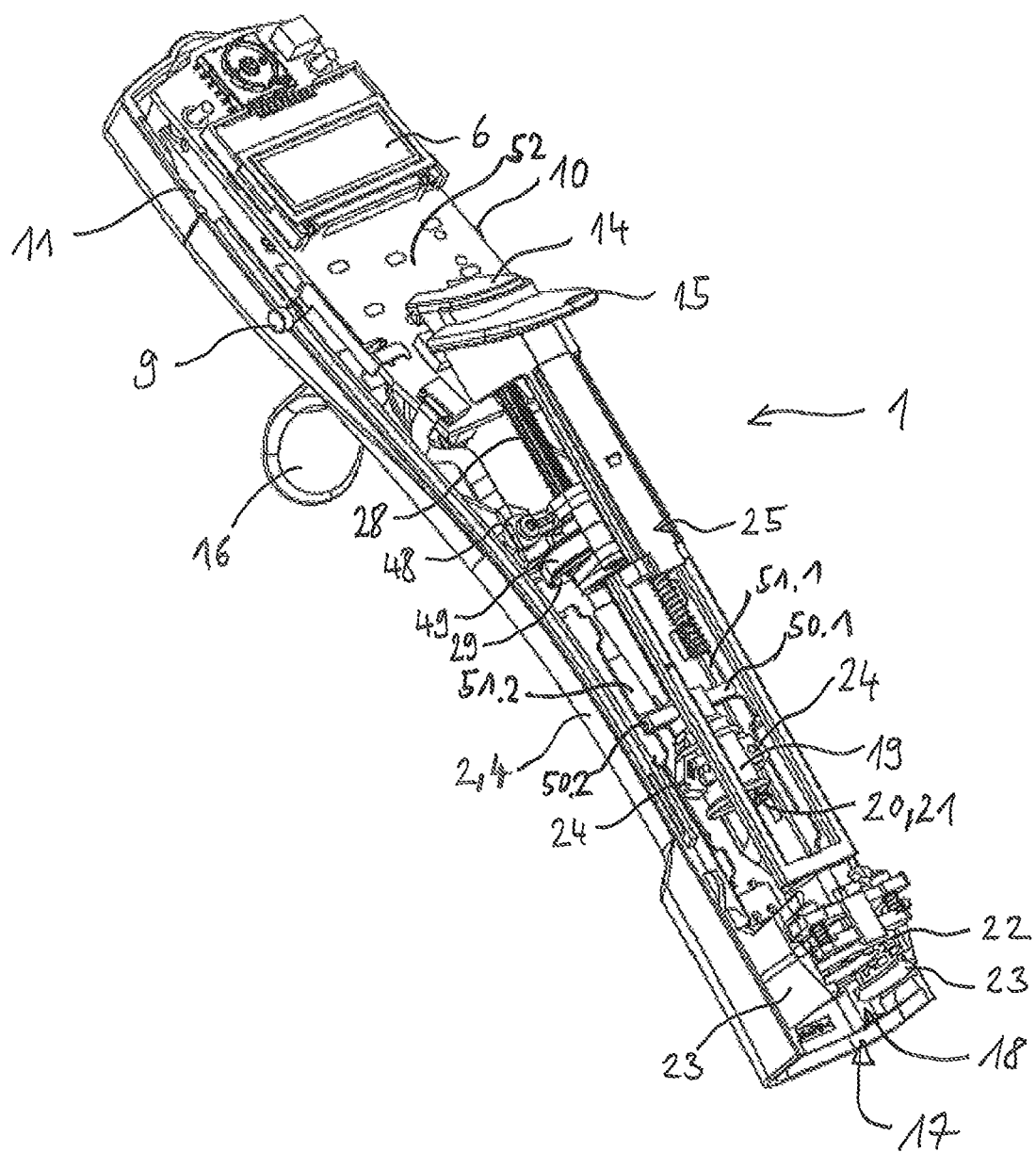

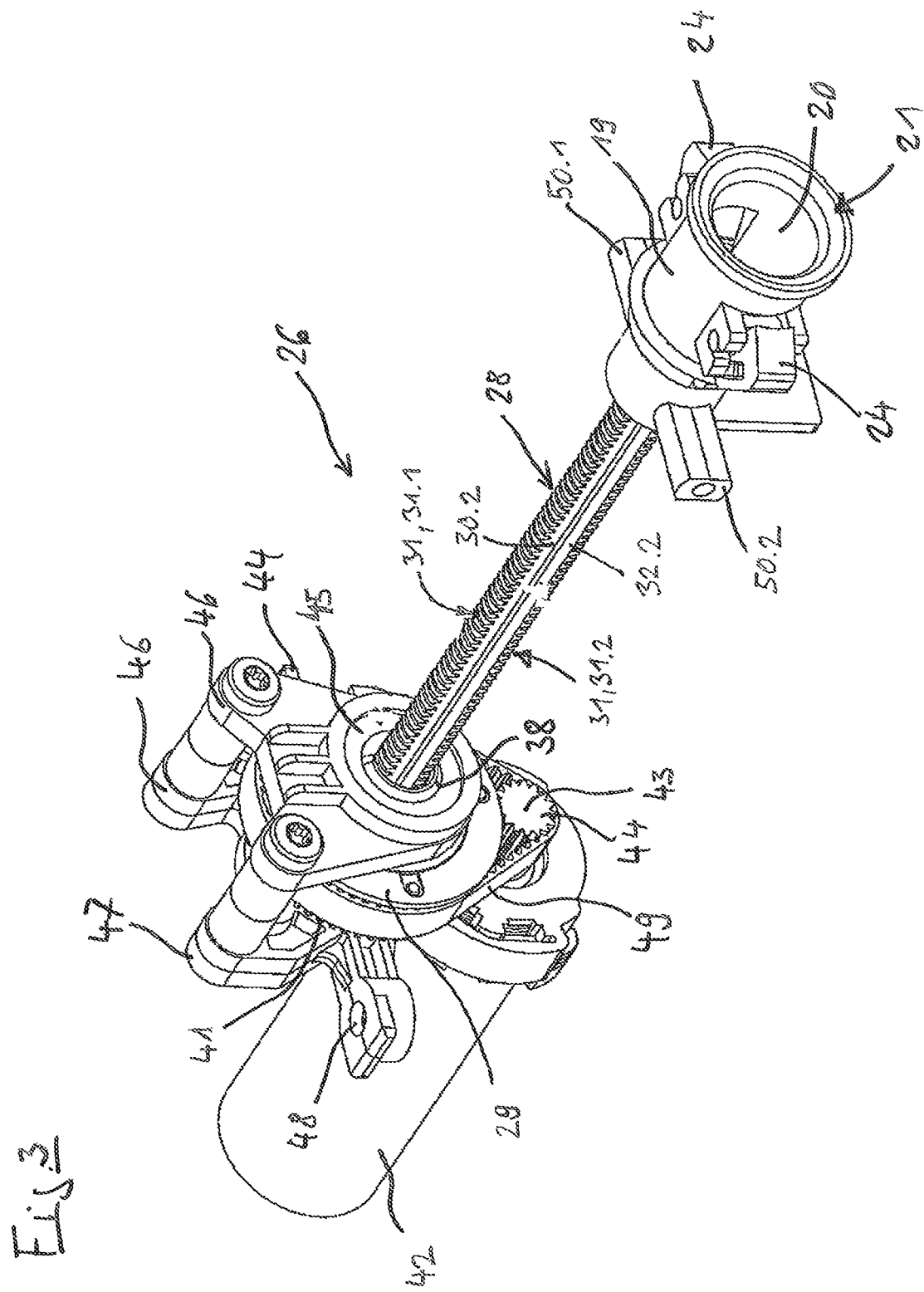

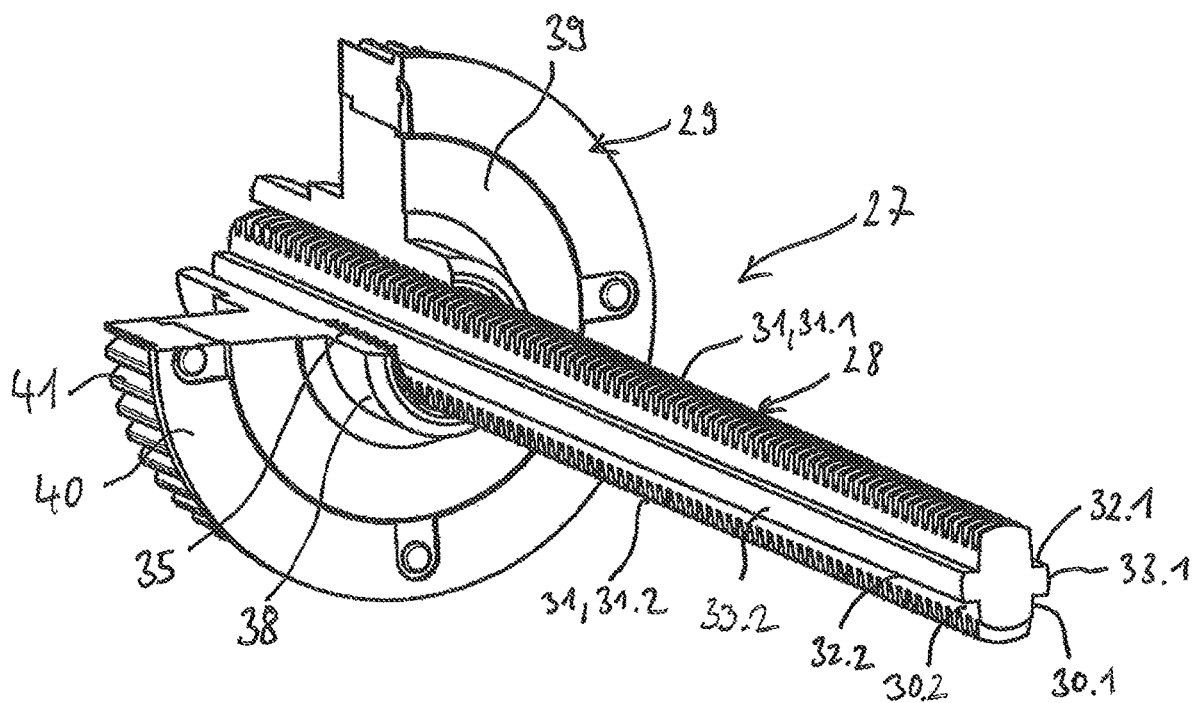

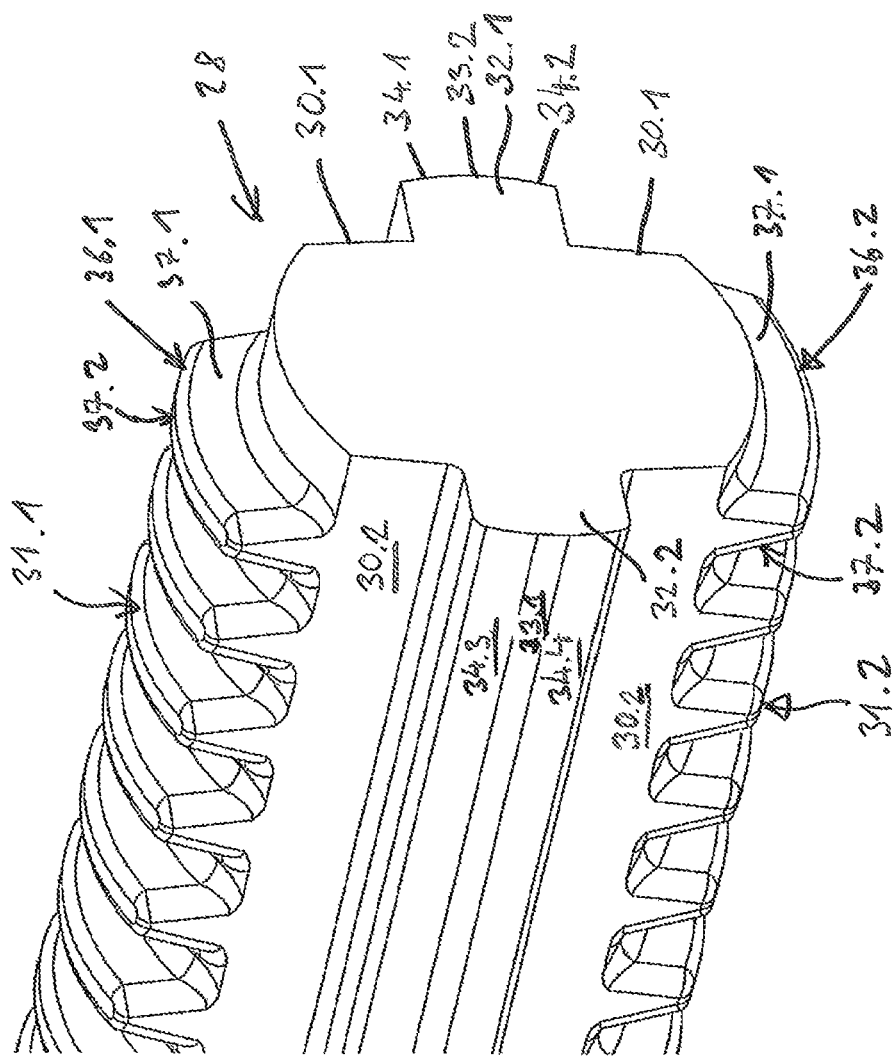

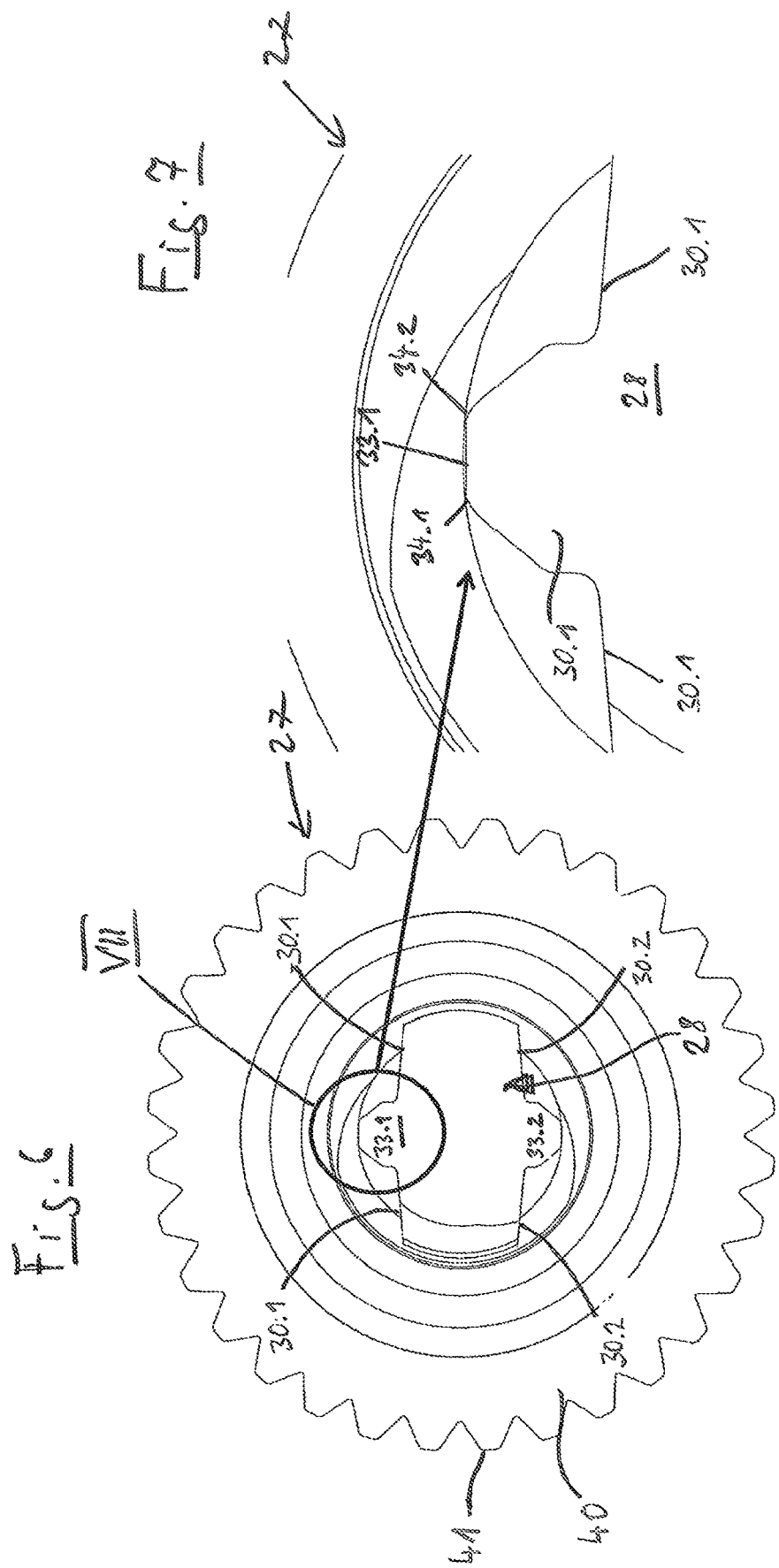

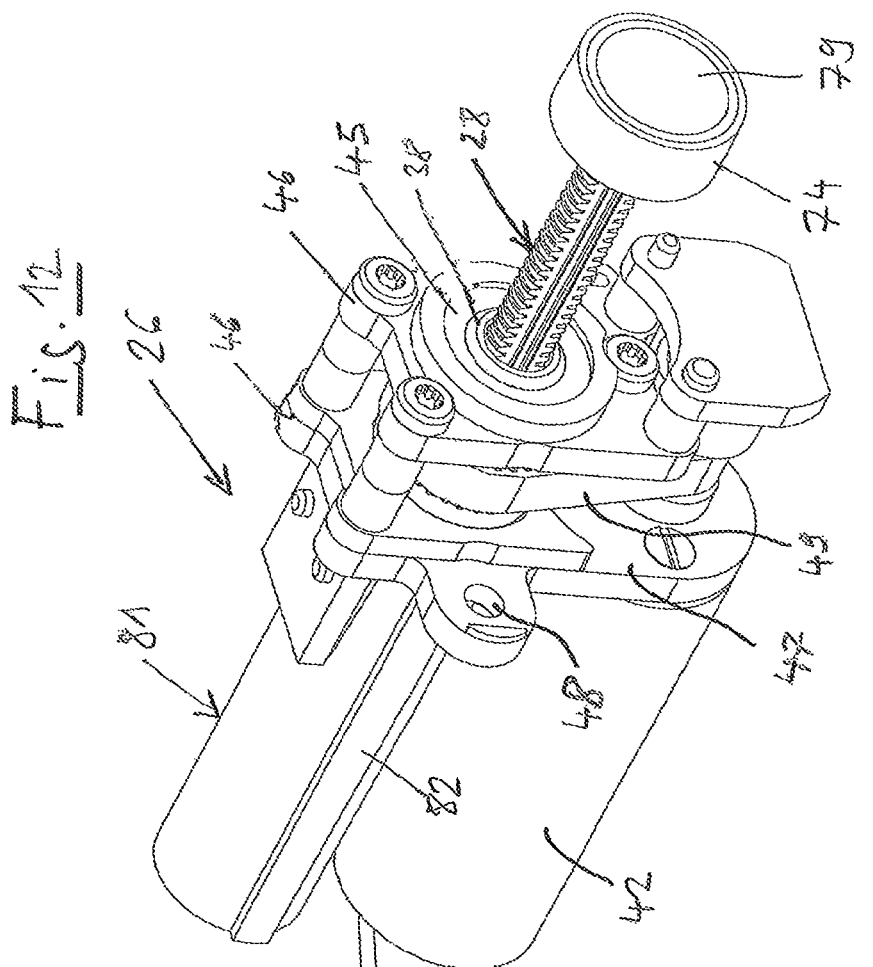
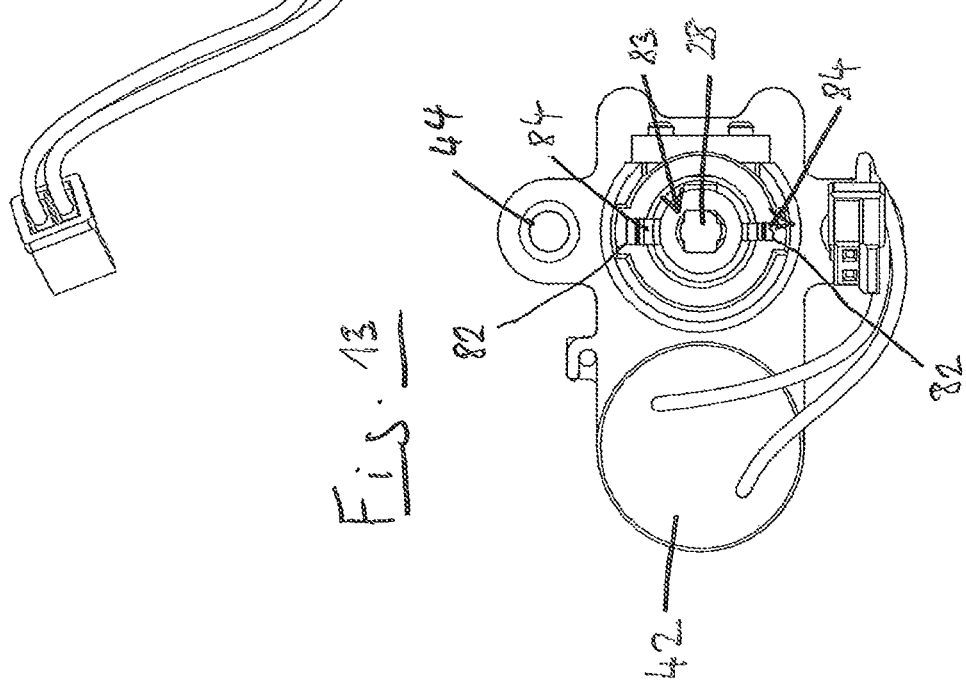

ELECTRONIC DOSING DRIVE

Cross-Reference to Related Applications

This application claims priority to European Patent Application Number 17 169 764.2 filed May 5, 2017, the entire contents of which being incorporated by reference herein.

The invention relates to an electronic dosing drive comprising a spindle drive and an electronic drive motor for driving a plunger in a cylinder.

BACKGROUND OF THE INVENTION

Electronic dosing devices are utilized in particular in scientific and industrial laboratories with medical, molecular biological and pharmaceutical areas of application for dosing liquids. Electronic dosing devices have an electronic dosing drive for driving a plunger in a cylinder. In direct displacement systems, the dosing device is coupled with an exchangeable syringe. The electronic dosing drive drives a syringe plunger in a syringe cylinder of the syringe, through which the receiving of liquid into the syringe and the discharge of liquid from the syringe is controlled. In doing this, the syringe plunger comes into contact with the liquid. The discharge occurs preferably in multiple steps. The syringe is exchangeable in order to prevent carryovers when different liquids are dosed with the same dosing device.

In the case of air cushion systems, the electronic dosing device comprises, besides the dosing drive, a cylinder and a plunger that can be displaced therein and is coupled with the dosing drive. Furthermore, the dosing device has a seal seat for firmly clamping and sealing a pipette tip. A hole in the seal seat is connected to the cylinder via a channel. The pipette tip is a tube with a lower opening on the lower end and an upper opening on the upper end. By moving the plunger in the cylinder, air can be displaced through the upper opening in order to suck liquid into and expel liquid out of the pipette tip through the lower opening. In doing this, the plunger and cylinder do not come into contact with the liquid. The pipette tip can be exchanged after use.

The syringe and pipette tip are typically made of plastic.

Electronic manual dosing devices can be carried and operated by the user with only one hand. Direct displacement systems are also termed electronic dispensers or repeating pipettes. Air cushion systems are also termed pipettes. They are hereby semi-automated, since they must be positioned and operated by hand, wherein the (syringe) plunger is driven by an electric drive motor. Compared to dosing devices with manual drives, the high reproducibility and the precision, the user-friendliness and ergonomics as well as the multi-functionality are advantageous and enable dispensing, reverse pipetting, diluting, mixing and titrating.

Furthermore, electronic dosing devices are integrated into automated dosing systems (LHS=liquid handling stations) and automated laboratory systems (WS=work stations). These have a dosing tool and a robot arm for positioning the dosing tool. The robot arm is, for example, an XYZ transfer system. They enable quick and reproducible fully automated dosing via pipetting, dispensing or other dosing methods.

The electronic dispensers Multipette® E3/E3x comprise a housing with a first receiver for a syringe flange of a syringe cylinder of the syringe and a receiving body with a second receiver for a plunger rod end of the syringe plunger. Furthermore, the housing comprises an electronic dosing drive that comprises a spindle drive with a threaded spindle and a spindle nut, and an electric drive motor. The receiving body is firmly attached to one end of the threaded spindle and is guided in the longitudinal direction of the threaded spindle in the housing. The electric drive motor firmly arranged in the housing is coupled with the spindle nut. An electric control apparatus is connected to the electric drive motor, and an electrical power supply is connected to the electric drive motor and the electric control apparatus. The threaded spindle and spindle nut are made of metal.

The electronic pipettes Xplorer®/Xplorer® plus from Eppendorf AG have in the housing at least one cylinder with a plunger movable therein. Each cylinder is connected via a channel to a hole in an attachment for clamping on a pipette tip. These pipettes exist as single-channel pipettes with only one cylinder, one plunger movable therein and one attachment connected to the cylinder. They also exist as multi-channel pipettes with multiple cylinders, plungers movable therein and attachments connected to the cylinders. A threaded spindle is connected to the at least one plunger and is guided in the longitudinal direction in the housing. Otherwise, the electronic dosing drive of these electronic pipettes corresponds to that of the electronic dispensers.

A disadvantage is the complex manufacturing of the threaded spindle by means of highly precise lathes and finishing, for example by deburring. Furthermore, a hitting of the threaded spindle can occur if it protrudes farther out of the spindle nut with the non-guided end. The spindle drive is susceptible to corrosion. Corrosion increases the friction and therefore the wear as well as decreasing the dosing accuracy. The spindle drive requires lubricant, which binds dust, through which the wear is increased and the dosing accuracy is lowered. Overload can lead to plastic deformation which also lowers the precision of the spindle drive.

DE 10 53 883 A describes a threaded spindle made of sheet metal that is composed of two U-profile strips that are welded to each other on their longitudinal edges. The distance between the welding beads on both sides of the threaded spindle is smaller than the diameter of the thread core. This threaded spindle is suitable for simple jacks taken along by the driver, for work-holding devices on workbenches and joiner's benches, for example in joiner's and glazier's workshops, for screw clamps and other apparatuses for which the requirements on the spindle regarding the running characteristics are not too high.

GENERAL DESCRIPTION OF THE INVENTION

Starting from this, it is the object of the invention to create an electronic dosing device for actuating a syringe with improved dosing accuracy.

According to the invention, the object is achieved by an electronic dosing device having the features of claim 1. Advantageous embodiments of the dosing device are specified in the dependent claims.

The electronic dosing drive according to the invention comprises:
- a support structure,
- a threaded spindle with an external thread for driving a plunger in a cylinder,
- at least one first guide element firmly connected to the threaded spindle that is guided parallel to the threaded spindle on a second guide element firmly connected to the support structure,
- a spindle nut with an internal thread that is in engagement with the external thread of the threaded spindle,
- an electric drive motor attached to the support structure that has a motor shaft coupled with the spindle nut,
- an electric control apparatus connected to the electric drive motor, an electrical power supply connected to the electric drive motor and the electric control apparatus, characterized in that the external thread of the threaded spindle has multiple threaded areas that are separated from each other by first flattenings on their circumference extending in the longitudinal direction, and the first flattenings have guide areas that abut the core diameter of the internal thread of the spindle nut.

According to the invention, the spindle drive has a threaded spindle that is subdivided into multiple threaded areas and multiple guide areas. In the circumferential direction, a threaded area is arranged on both sides of each guide area and a guide area is arranged on both sides of each threaded area. The threaded areas engage with the internal thread of the spindle nut, whereby the displacement of the threaded spindle while turning is ensured. The guide areas abut the core diameter of the internal thread of the spindle nut so that they are guided in the spindle nut. As a result, the spindle nut is simultaneously a guide bushing for the threaded spindle. Additional components for guiding the threaded spindle can be omitted and space for accommodating additional components is spared. Therefore, an improved guiding of the threaded spindle is possible even with limited space. The spindle drive is particularly precise because the threaded spindle is guided two-fold, namely by the first guide element on the second guide element and at a distance from the first guide element by the guide areas on the spindle nut. This increases the dosing accuracy.

According to one embodiment of the invention, the threaded spindle is an injection molded part. In this embodiment, the threaded spindle is produced by means of injection molding from one or more plastics or from at least one other injection-moldable material. The subdivision of the threaded spindle into threaded areas and guide areas is advantageous for the production of the threaded spindle by injection molding since the subdivision of the external thread enables an injection-molded production by means of an injection molding tool with multiple mold parts. The parting plane of the injection molding tool can be placed so that it falls in the guide areas. Undercuts in the threaded areas which hinder the demolding of the threaded spindle from the injection molding tool and impair the precision can hereby be avoided or greatly reduced. The costs for the production of the threaded spindle can be reduced and finishing is spared.

According to another embodiment, the threaded spindle is made of a first plastic. The plastic threaded spindle has improved anti-friction properties. The wear is hereby reduced and the loss of dosing accuracy is diminished. The corrosion resistance and chemical durability of the plastic threaded spindle also diminishes the wear and the associated loss of precision. Moreover, plastics with improved anti-friction properties are available so that lubricant, which binds dust and causes wear as well as loss of dosing accuracy, can be omitted. It is, however, also possible to improve the anti-friction properties even more by applying small amounts of lubricant. The reduced friction between the threaded spindle and spindle nut lowers the power consumption of the motor and increases the battery life. Finally, the plastic threaded spindle reduces the weight of the dosing device and improves the ease of operation. Plastics with high mechanical resilience are available. Since these plastics have only a low or no plastic deformation but rather break when overloaded, an overloading does not lead to a deterioration of the dosing accuracy but rather to breakage so that the necessity of a repair is easily discernible. According to a preferred embodiment, the plastic threaded spindle is an injection molded part. According to another embodiment, the plastic threaded spindle is a sintered part, i.e., the threaded spindle is produced by means of sintering plastic particles. According to another embodiment, the plastic threaded spindle is produced by means of cutting, rolling and/or milling. According to another embodiment, the plastic threaded spindle is produced by means of 3D printing.

According to another embodiment, the threaded spindle is made of metal. According to another embodiment, the metal threaded spindle is produced by means of cutting, rolling and/or milling. According to another embodiment, the metal threaded spindle is produced by means of sintering metal powder.

According to another embodiment, the threaded spindle is produced by means of MIM (metal injection molding). For this, a metal powder is mixed with a plastic matrix and injection molded. The result is a threaded spindle that is made completely or substantially of metal because the plastic is removed during the production process.

The advantageous effects of the production of the threaded spindle by injection molding apply to a plastic threaded spindle produced by means of injection molding as well as to the threaded spindle produced by means of MIM.

According to a preferred embodiment of the invention, there is a clearance fit between the guide areas and the core diameter of the internal thread. The nominal core diameter of the internal thread is hereby the same as the nominal diameter of the threaded spindle on the guide areas. The nominal diameter on the guide areas is the diameter of the smallest circle touching the guide areas and fully enveloping them. The tolerances of the two diameters are chosen so that there is a clearance fit. For example, in the case of a nominal diameter of 3.25 mm a tolerance H11 is chosen for the core diameter, which allows a deviation of 0 to +75 μm from the nominal diameter. Furthermore, a tolerance d9 is chosen for the external diameter of the guide areas, which allows a deviation from the nominal diameter of −30 μm to −60 μm. The clearance between the internal thread and the guide ribs is minimally 30 μm and maximally 135 μm.

The clearance of the clearance fit is, according to a preferred embodiment, maximally 150 μm and minimally 0 μm, further preferably maximally 135 μm and minimally 30 μm.

According to another embodiment, the flattenings bear guide ribs that have the guide areas on the outer ends. A particularly low-friction guiding of the threaded spindle in the spindle nut is hereby achieved. Moreover, guide ribs are advantageous for the production of the threaded spindle by means of injection molding because the parting plane of the injection molding tool can be placed in the plane of the guide ribs.

According to a preferred embodiment, the threaded spindle has only two first flattenings diametrically opposite each other in which the parting plane of two tool halves of an injection molding tool can be placed. According to another embodiment, there are only two guide ribs diametrically opposite each other. This enables a comparatively simple injection molding tool with easy demolding and high dimensional stability.

According to another embodiment, the guide ribs have a second flattening on each end and, bordering the two side edges of the second flattening, guide areas at a distance from the central axis of the threaded spindle corresponding to half of the core diameter of the spindle nut. In this embodiment, the guide ribs are each guided on the guide areas on both sides of the second flattenings. This has the advantage that the demolding burrs generated on the second flattenings during injection molding of the threaded spindle do not come into contact with the spindle nut and prevent a precise guiding of the threaded spindle in the spindle nut. In principle, however, it is also possible to guide the threaded spindle on the outer ends of the guide ribs where the parting plane of the injection molding tool is located during production. Demolding burrs can be avoided by precise production of the injection molding tool or respectively removed by finishing.

According to another embodiment, the first flattenings are planar surfaces and/or the second flattenings are planar surfaces. According to a preferred embodiment, guide ribs project to the outside from first flattenings formed by planar surfaces. The areas of a first flattening in the form of planar surfaces that are arranged on various sides of the same guide rib can be aligned parallel or at an angle to each other.

According to an alternative embodiment, the first flattenings are curved to the outside and/or the second flattenings are curved to the outside. The curvature radii of the first flattenings are larger than half of the core diameter of the internal thread of the spindle nut or are the same, and/or the curvature radii of the second flattenings are larger than half of the core diameter of the internal thread of the spindle nut.

According to an alternative embodiment, the guide areas are simultaneously the first flattenings that are curved to the outside or sections thereof. In this embodiment, the first flattening do not bear guide ribs. The first flattenings can additionally be provided with second flattenings, wherein the curvature radius of the second flattenings is larger than half of the core diameter of the spindle nut. Demolding burrs generated during injection molding in the second flattenings do not come into contact with the spindle nut. Alternatively, demolding burrs are avoided by precise production of the injection molding tool or removed by finishing.

According to another embodiment, the external thread and the internal thread is a trapezoidal thread or a V-thread or a round thread or a buttress thread.

According to another embodiment, the threaded areas of the external thread taper between the first flattenings in the radial direction to the outside. This is advantageous for the demolding of the threaded spindle from an injection molding tool.

According to another embodiment, the outer longitudinal edges of the guide ribs and/or the transitions from the guide ribs to the first flattenings are rounded. This is advantageous for the demolding from the injection molding tool. The rounded-off longitudinal edges of the guide ribs reduce the friction of the threaded spindle in the spindle nut.

According to another embodiment, the side edges of the thread profiles delimited by the flattenings are rounded off. This promotes the low-friction sliding of the threaded spindle in the spindle nut and reduces the wearing. This is also advantageous for the demolding from the injection molding tool.

According to another embodiment, the transitions of the flanks of the thread profiles to the core of the threaded spindle and/or the outer edges of the thread profiles in the radial direction are rounded off. This promotes the low-friction sliding of the threaded spindle in the spindle nut and reduces the wearing. This is also advantageous for the demolding from the injection molding tool.

According to another embodiment, the spindle nut is produced from a second plastic and/or from a metal. The production of the spindle nut from at least one plastic or from at least one other injection-moldable material can occur by means of injection molding. The injection molding tool can hereby have a corresponding tool core for generating the internal thread of the spindle nut. Furthermore, the production of the spindle nut from plastic can occur by means of sintering, cutting, rolling and/or milling or 3D printing. The production of the spindle nut from metal can occur by means of thread cutting, tapping or thread milling, by means of MIM or by means of sintering metal powder.

According to another embodiment, the first plastic is a high-performance plastic or an engineering plastic.

According to another embodiment, the first plastic is selected from at least one of the following high-performance plastics: PEEK, PPS, LCP, PPA, PEI, PES, PPSU, PSU, PC-HT. According to another embodiment, the first plastic is selected from at least one of the following engineering plastics: PA, ABS. The threaded spindle can be produced exclusively from one of the aforementioned plastics or with the multi-component injection molding method from a combination of multiple of the aforementioned plastics.

According to another embodiment, the second plastic is a high-performance plastic or an engineering plastic.

According to another embodiment, the second plastic is selected from at least one of the following high-performance plastics: PEEK, PPS, LCP, PPA, PEI, PES, PPSU, PSU, PC-HT. According to another embodiment, the second plastic is selected from at least one of the following engineering plastics: PA, ABS. The spindle nut can be produced with the single-component injection molding method from only one of the aforementioned plastics or with the multi-component injection molding method from multiple of the aforementioned plastics.

According to a preferred embodiment, the first plastic and the second plastic are high-performance plastics.

According to another embodiment, the threaded spindle and the spindle nut are produced from the same plastic material. According to another embodiment, the threaded spindle and spindle nut are produced from the same plastic material, wherein, however, various variations of the plastic types are used. According to another embodiment, the threaded spindle and spindle nut are produced from the same plastic material that, for example, differ regarding the addition of fillers or additives.

Furthermore, the invention relates to an electronic dosing device comprising an electronic dosing drive according to the invention, a first receiver for a syringe flange of a syringe cylinder of a syringe firmly arranged on the support structure, and a receiving body with a second receiver for a plunger rod end of a syringe plunger of a syringe, wherein the receiving body is firmly connected to a lower end of the threaded spindle.

This electronic dosing device according to the invention is a direct displacement system.

The dosing drive is designed according to one of claims 1 to 13.

According to another embodiment, the electronic dosing device comprises first means for releaseably holding the syringe flange in the first receiver and second means for releaseably holding the plunger rod end in the second receiver. The first receiver and the second receiver as well as the first means for releaseably holding and the second means for releaseably holding are preferably designed as described in EP 0 656 229 B1 and U.S. Pat. No. 5,620,660 A, the contents of which are hereby introduced into the present application.

Furthermore, the invention relates to an electronic dosing device comprising an electronic dosing drive according to the invention, at least one cylinder in which a plunger is movably arranged which is coupled with the lower end of the threaded spindle, at least one seal seat for firmly clamping and sealing a pipette tip, and at least one connecting channel that connects a hole in the seal seat to the cylinder.

This electronic dosing device is an air cushion system. The dosing drive is designed according to one of claims 1 to 13.

According to one embodiment, the seal seat is the lateral surface of a conical and/or cylindrical attachment and there is the hole in the end surface of the attachment.

According to another embodiment, the electronic dosing device has only one cylinder with a plunger that is movable therein. This is hereby a single-channel dosing device. According to another embodiment, the electronic dosing device has multiple parallel cylinders with a moveable plunger therein as well as multiple seal seats that are each connected to a cylinder via a connecting channel. This is hereby a multi-channel dosing device.

The support structure can be any structure that is suitable for attaching the second guide element and the drive motor in defined positions in relation to each other. According to another embodiment, the support structure is made of one or of multiple components.

According to another embodiment, the electronic dosing device is an electronic manual dosing device. According to another embodiment, the electronic manual dosing device is an electronic manual dispenser or an electronic manual pipette. According to another embodiment, the support structure of the electronic manual dosing device is a housing and/or a frame (chassis) and/or a support of the electronic manual dosing device.

According to another embodiment, the electronic dosing device is an automated dosing system or a work station. According to another embodiment, the spindle drive is arranged in an exchangeable dosing tool that is connected to the robot arm on which the drive motor is attached. The dosing tool is connected to the robot arm so that it is held on the arm and the drive motor is connected to the spindle nut. The connection of dosing tool and robot arm is designed so that it can be intentionally released. The dosing tool and its connection to a tool holder of a robot arm is, for example, designed as described in EP 1 449 586 B1 and U.S. Pat. No. 7,402,440 B2, the contents of which are hereby introduced into the present application.

According to another embodiment, the support structure is a housing and/or frame (chassis) and/or a support of the dosing tool and/or of the robot arm of the automated dosing system or automated laboratory system.

According to another embodiment that is designed as a direct displacement system, the dosing tool comprises the first receiver and the second receiver as well as the first means for releaseably holding and the second means for releaseably holding. According to another embodiment that is designed as an air cushion system, the dosing tool comprises at least one cylinder with a plunger that is movable therein, at least one seal seat for firmly clamping and sealing a pipette tip, and at least one connecting channel for connecting a hole in the seal seat to the cylinder.

BRIEF DESCRIPTION OF THE DRAWINGS

The invention will be further explained in the following with reference to the accompanying drawings of exemplary embodiments. In the drawings:

FIG. 1 shows an electronic manual dosing device in a perspective view from the side;

FIG. 2 shows the lower part of the same dosing device without the front half of the housing in the same perspective view;

FIG. 3 shows the spindle drive and electric drive motor of the same dosing device in a perspective view from the side;

FIG. 4 shows the spindle drive of the same dosing device in an enlarged, partially exploded perspective view from the side;

FIG. 5 shows the threaded spindle of the same dosing device in an enlarged, perspective partial view;

FIG. 6 shows the spindle drive in a cross-section through the spindle nut;

FIG. 7 shows enlarged detail VII from FIG. 6;

FIG. 12 shows the same dosing drive in a perspective view from the side;

FIG. 13 shows the same dosing drive in a rear view;

DETAILED DESCRIPTION OF THE PREFERRED EMBODIMENTS

Figure 8:
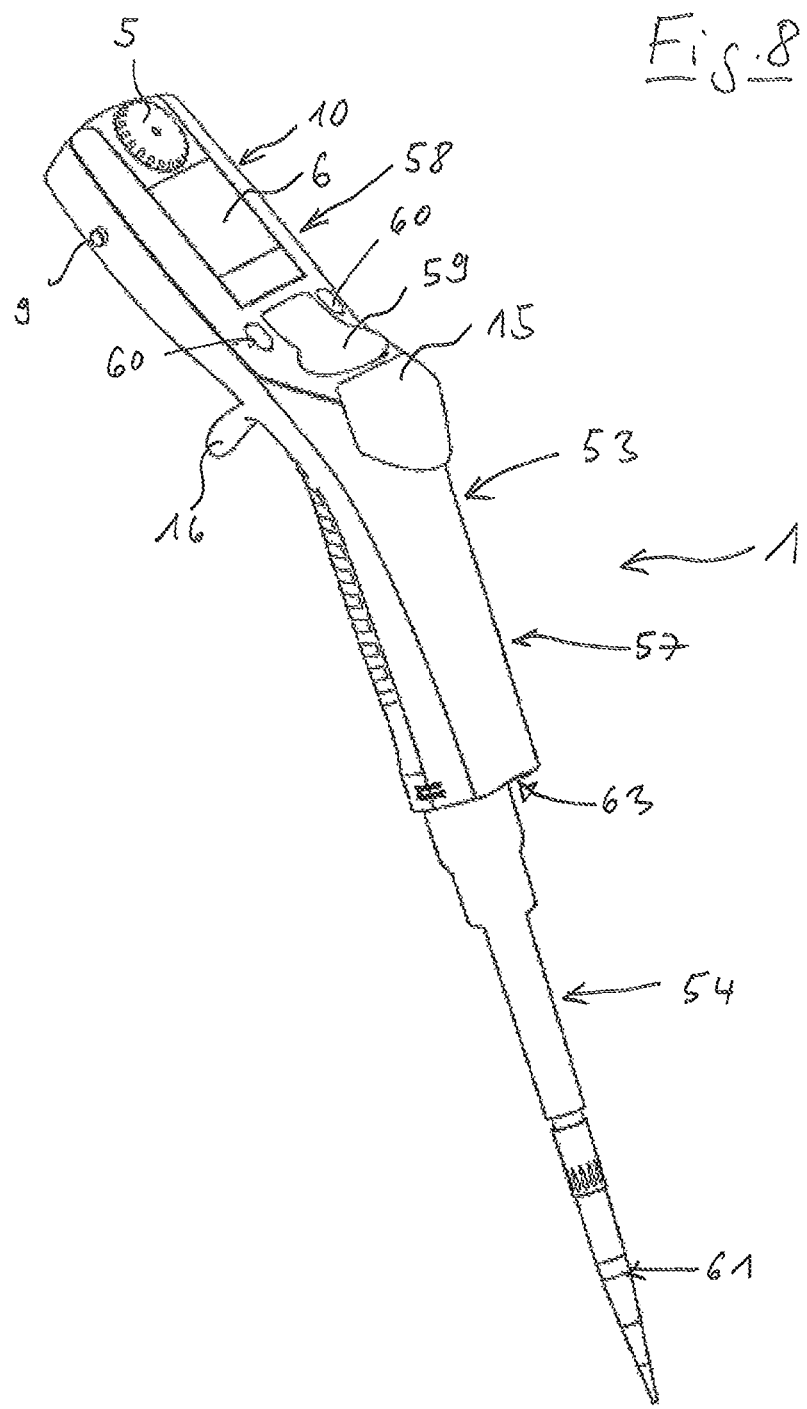
FIG. 8 shows another electronic manual dosing device in a perspective view from the side.

In the present application, "up" and "down" as well as indicators derived therefrom refer to a vertical orientation of the threaded spindle and arrangement of the drive motor above the threaded spindle.

Features of various exemplary embodiments that are addressed with the same terms are provided with the same reference signs in the following.

The electronic manual dosing device 1 according to FIGS. 1 and 2 is an electronic manual dispenser. It has a rod-shaped housing 2 that is divided in the longitudinal direction into a front housing hull 3 and a rear housing hull 4.

On the front side of the housing 2, a selection wheel 5 for selecting the respective operating mode is located on the upper end. By means of the selection wheel 5, the dosing functions pipetting, dispensing and titrating, for example, can be set.

Under that, a display 6 is recessed into the front side of the housing 2.

Beneath the display 6, two rocker switches 7, 8 that serve to call up various menu functions and to set parameters project from the front side of the housing 2.

At the height of the rocker switches 7, 8, electrical contacts 9, 10 for charging a battery of an electrical power supply 11 are located on the left and the right side of the housing. The battery is accommodated in the upper part of the housing 2.

Between the two rocker switches 7, 8, a reset button 12 is located in the front of the housing.

In the middle underneath the reset button 12, a trigger button 14 is located above on a curvature 13 on the front side of the housing 2 for triggering sucking and dispensing steps as well as for saving parameter settings. In front of the trigger button 14, an ejector button 15 is located that engages with the curvature 13 that fits snugly downward against the flat front side of the housing 2.

A hook-shaped finger rest 16 projects to the back from the back side of the housing 2.

On the lower end, the housing 2 has a first opening 17 through which a first receiver 18 in the housing 2 for a syringe flange of a syringe cylinder of a syringe is accessible from the outside. According to FIG. 2, above the first receiver 18 a bell-shaped receiving body 19 is located in which a second receiver 20 is arranged that is accessible through a second opening 21 on the underside of the receiving body 19 for inserting a plunger rod end of a syringe plunger of the syringe.

In the first receiver 18, first means for releaseably holding the syringe flange are located on a stop 22 in the housing 2 that are designed as a syringe gripping lever 23.

The receiving body 19 has second means for releaseably holding in the form of plunger gripping levers 24 that serve to releaseably hold the syringe plunger in the second receiver 20.

The attachment of the syringe flange and syringe plunger in the first and second receivers 18, 20 by means of the first and second means for releaseably holding can be loosened by actuating the ejector button 15 that works via a gear 25 on the syringe gripping lever 23 and plunger gripping lever 24.

When a syringe is held in the dosing device, the syringe plunger is displaceable by means of a dosing drive 26.

According to FIGS. 3 and 4, the dosing drive 26 comprises a spindle drive 27 that has a threaded spindle 28 and a spindle nut 29.

The threaded spindle 28 has two first flattenings 30.1, 30.2 on both sides that extend in the longitudinal direction and two threaded areas 31.1, 31.2 of an external thread 31 between them. According to FIGS. 4 and 5, the threaded areas 31.1, 31.2 taper in the cross-section in the radial direction to the outside.

Guide ribs 32.1, 32.2 project to the outside from the first flattenings 30.1, 30.2. According to FIGS. 4 and 5, the guide ribs 32.1, 32.2 have two flattenings 33.1, 33.2 on the outer end. Next to these, they have guide areas 34.1, 34.2, 34.3, 34.4, the distance of which from the central axis of the threaded spindle 28 corresponds to half of the core diameter of an internal thread 35 of the spindle nut 29.

According to FIG. 5, the external thread 31 has trapezoid-shaped thread profiles 36.1, 36.2. The outer edges of the thread profiles 36.1, 36.2 in the radial direction are rounded. Furthermore, the transitions of the flanks 37.1, 37.2 of the thread profiles 36.1, 36.2 are rounded on both sides to the core of the threaded spindle 28. Finally, the side edges of the thread profiles 36.1, 36.2 that are delimited by the first flattenings 30.1, 30.2 are rounded.

The outer edges of the guide ribs 32.1, 32.2 and the transitions of the guide ribs 32.1, 32.2 to the first flattenings 30.1, 30.2 are also rounded.

The threaded spindle 28 is injection molded so that the parting plane of the two halves of the injection molding tool falls in the second flattenings 33.1, 33.2. The roundings of the guide ribs 32.1, 32.2 and of the thread profiles 36.1, 36.2 are advantageous for the filling of the injection molding mold and the demolding of the molded part from the injection molding tool. The roundings of the profiles 36.1, 36.2 and of the guide areas 34.1, 34.2, 34.3, 34.4 are moreover advantageous for the low-friction and low-wear shifting of the threaded spindle 28 in the spindle nut 29.

According to FIG. 4, the spindle nut 29 has a central hollow shaft 38, on the inner circumference of which the internal thread 35 is designed. The internal thread 35 extends continually over a first section of the sleeve. The thread profile of the internal thread 35 is also trapezoid-shaped, wherein the radially inner ends of the profile are rounded and the transitions between the flanks of the profile as well.

A circular collar 39 that is designed as a toothed belt wheel 40 with teeth 41 on the circumference sits on the hollow shaft 38. The hollow shaft 38 projects from the circular collar 39 to both sides.

The external thread 31 of the threaded spindle 28 and the internal thread 35 of the spindle nut 29 are coordinated with each other so that the threaded spindle 28 can be screwed into the spindle nut 29.

According to FIGS. 6 and 7, the guide areas 34.1 to 34.4 internally abut each turn of the internal thread 35 of the spindle nut 29.

A clearance fit occurs between them.

The dosing drive 26 further comprises, according to FIG. 3, an electric drive motor 42 that supports a further toothed belt wheel 44 on a motor shaft 43. The spindle nut 29 is rotatably mounted on the hollow shaft 38 in two bearing bushings 45 and is held in two parallel holding plates 46 of a holder 47 at a defined distance from each other and from the drive motor 42. The holder 47 has bearing eyes 48 for fixing in the housing 2.

A toothed belt 49 is placed around the tooth belt wheels 40, 44 in order to transfer the rotation of the motor shaft 43 to the spindle nut 29.

Furthermore, the dosing drive 26 comprises peg-shaped first guide elements 50.1, 50.2 that project from the receiving body 19 to the outside in opposite directions. According to FIG. 2, the first guide elements 50.1, 50.2 work together with guideways between bar-shaped second guide elements 51.1, 51.2 on the inner sides of the housing hulls 3, 4. The threaded spindle 28 is hereby hindered from a rotation in the housing 2 and the receiving body 19 is guided in the axial direction of the threaded spindle 28.

Furthermore, an electric control apparatus 52 arranged in the upper area of the housing belongs to the dosing drive 26. The control apparatus 52, the electric drive motor 42 and the remaining electronic components of the dosing device are fed from the electrical power supply 11.

By applying current to the drive motor 42, the motor shaft 43 and therefore the spindle nut 29 are set in rotation and the threaded spindle 28 is axially displaced. The threaded spindle 28 is hereby guided on the guide areas 34.1 to 34.4 in the internal thread 35. Due to the symmetrical arrangement of the guide areas 34.1 to 34.4, a very even running of the threaded spindle 28 is achieved.

The threaded spindle 28 and the spindle nut 29 are produced from plastics and/or metal. Preferably, high-performance plastics and/or engineering plastics are used for this. For example, the threaded spindle 28 and the spindle nut 29 are each made of PEEK.

Figure 9:
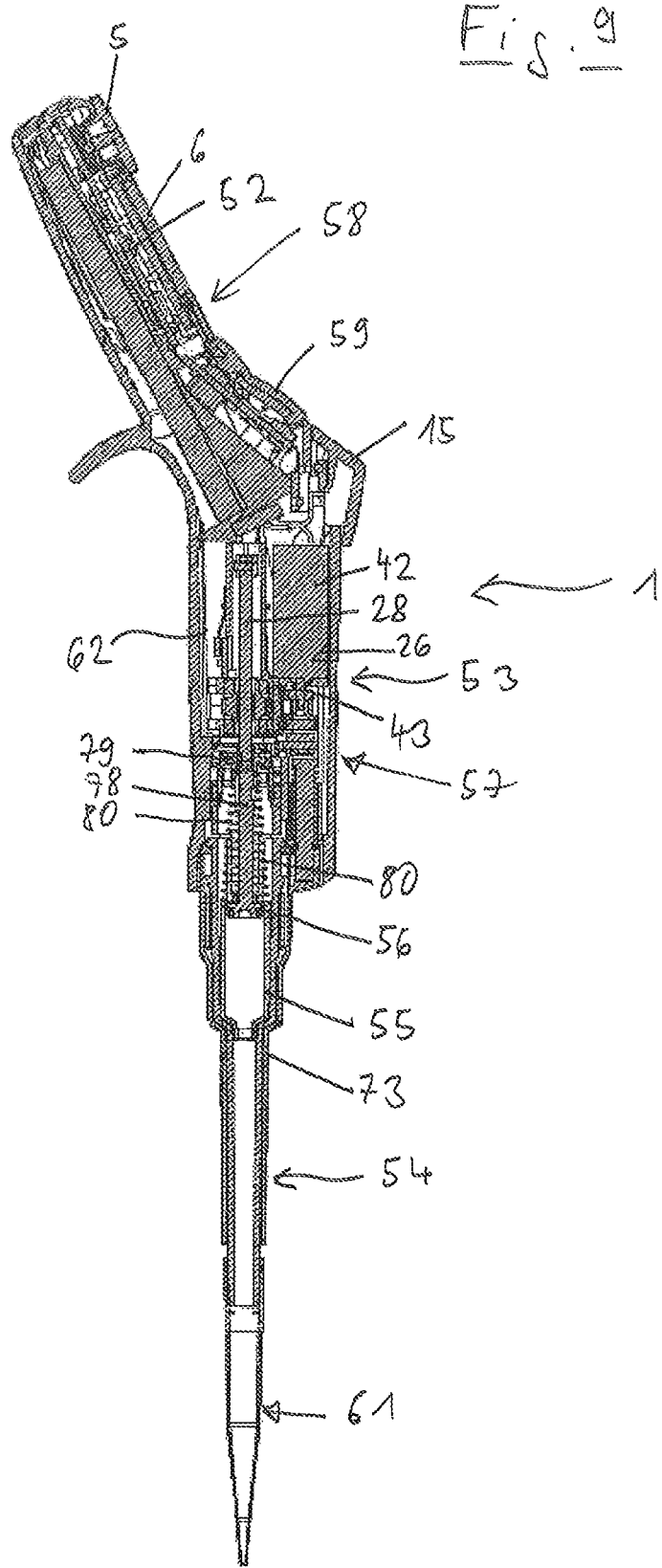
FIG. 9 shows a vertical section of the same manual dosing device.

The electronic manual dosing device 1 according to FIGS. 8 and 9 is an electronic manual pipette. It has an upper housing part 53 in the form of a hand grip and a substantially cylindrical lower housing part 54. The upper housing part 53 contains a drive unit and the lower housing part 54 contains a displacement unit composed of a cylinder 55 and a plunger 56 that is movable therein that can be displaced by means of the drive unit.

The upper housing part 53 has a substantially cylindrical trunk section 57 and a box-shaped head section 58 that with the trunk section 57 encloses an obtuse angle. The head section has a selection wheel 5 on the front side on the upper end for selecting the respective operating mode, for example pipetting, dispensing, pipetting and mixing, reverse pipetting, multiple receiving, sequential dispensing.

Under the selection wheel 5, a display 6 is recessed into the front side of the head section 58.

Underneath the display 6, there is a rocker button 59 in the middle for controlling the receiving and discharge of liquid and setting parameters. To both sides of the rocker button 59, there are further buttons 60 for selecting various menu functions and setting parameters.

Underneath the rocker button 59, an ejector button 15 for controlling the ejection of pipette tips 61 is located on the front side in the transition area between the head section 58 and truck section 57. The ejector button 15 is connected to an ejector rod that extends in the trunk section 57 to the lower end of same.

A hook-shaped finger rest 16 projects to the back from the back side of the head section 58.

At the height of the display 6, electrical contacts 9, 10 for charging a battery of an electrical power supply 11 accommodated in the head section 58 are located on the left and the right side of the head section 58. The battery is connected to an electric control apparatus 52 accommodated in the head section 58. The electric control apparatus 52 is connected to the rocker button 59 and the further buttons 60, a sensor for detecting the rotational position of the selection wheel 5, and a drive motor 42 of a dosing drive 26.

The trunk section 57 has a hollow space 62 in which the dosing drive 26 is arranged at the top which will be explained in greater detail below. The trunk section 57 has a lower housing opening 63 on the lower end, through which the lower housing part 54 is inserted with its upper end into the hollow space 62 of the trunk section 57. In the inserted position, the lower housing part 54 is releaseably connected to the upper housing part 53 by means for releaseably connecting the lower housing part 54 and the upper housing part 53. According to FIG. 10, the means for releaseably connecting comprise a locking connection with spring-loaded locking hooks 64 of the lower housing part 54 that are lockable in the hollow space 62 behind locking edges of the upper housing part 53. The locking can be intentionally reversed by moving an unlocking sleeve 65 guided on the outside of the lower housing part 54.

Figure 11:
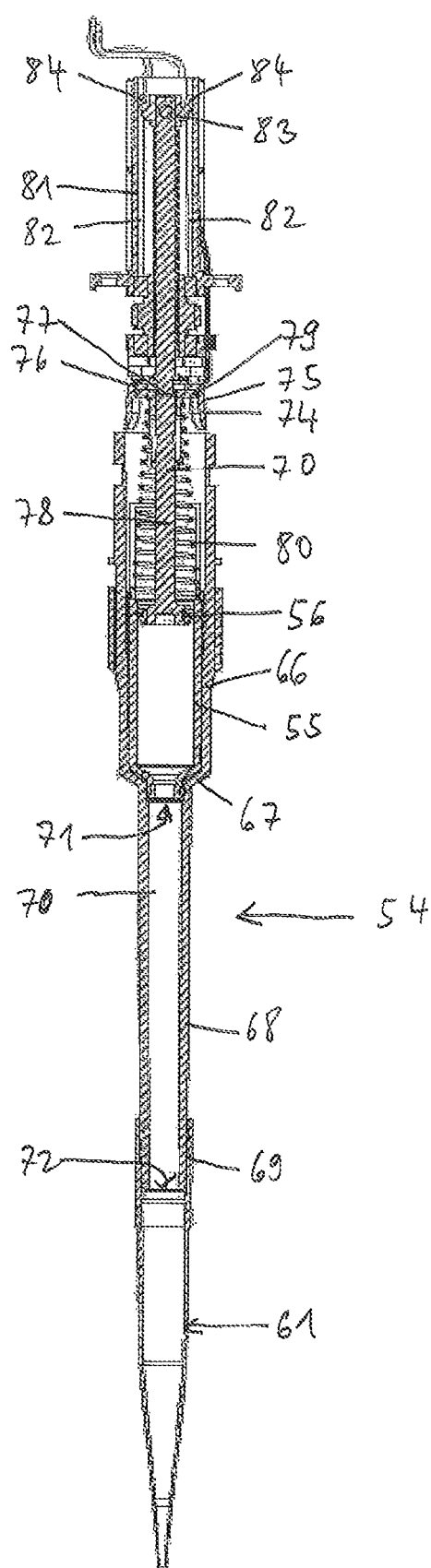
FIG. 11 shows a vertical section of the lower part of the same manual dosing device with dosing drive.

According to FIG. 11, the lower housing part 54 has the cylinder 55 at the top with the plunger 56 that can be displaced within it in the longitudinal direction and is guided in a sealing manner. The cylinder 55 is designed as a bushing (liner) that is held in a cylinder section 66 of the lower housing part 54. The cylinder section is connected at the bottom via a conical connecting section 67 to a tube 68 that has a seal seat 69 on the lower end onto which the pipette tip 61 is clamped. The tube 68 surrounds a connecting channel 70 that connects a first hole 71 on the lower end of the cylinder 55 to a second hole 72 in the seal seat 69 on the lower end of the tube 68.

On the cylinder section 66, the connecting section 67 and the tube 68, an ejector sleeve 73 adapted to the outer shape of same is slid on for forcing off the pipette tip 61 from the seal seat 69. The ejector sleeve 73 is connected at the top to the ejector rod via releaseable coupling means of the ejector sleeve 73 and ejector rod. The releaseable coupling means consist in a simple case in a clamping seat of the lower end of the ejector rod in a borehole in a side projection on the upper edge of the ejector sleeve 73.

The lower housing part 54 supports at the top a closing cap 74, the cap casing 75 of which is connected to the cylinder section 66 and which has a central upper housing opening 77 in a cap bottom 76.

The plunger 56 is connected to a plunger rod 78 that supports a disk 79 at the top. Between the disk 79 and the upper edge of the cylinder 55, a helical spring 80 is arranged that pushes the disk 79 into a starting position on the underside of the cap bottom 76.

According to FIG. 9 to 12, the threaded spindle 28 of the dosing drive 26 engages, with its lower end through the upper housing opening 77, with the closing cap 74 and abuts the upper side of the disk 79.

According to FIGS. 12 and 13, the dosing drive 26 largely corresponds to the dosing drive 26 from FIG. 3 so that the embodiments in FIG. 3 correspondingly apply for the features provided with the same reference numbers from FIGS. 12 and 13. In the case of the dosing drive 26 from FIGS. 12 and 13, the lower end of the threaded spindle 28 contacts the disk 79 and is not connected to a bell-shaped receiving body 19. Accordingly, in FIGS. 12 and 13 a guiding of the lower end of the threaded spindle 28 by guide elements 50.1, 50.2 on the receiving body 19 is omitted. Rather, the threaded spindle 28 is guided on the upper end in a guide cylinder 81 that projects from the upper side of the holder 47 for the bearing bushings 45 of the spindle nut 29.

The guide cylinder 81 has two guide grooves 82 on the inner circumference that extend in the longitudinal direction of the guide cylinder 81. The two guide grooves 82 are diametrically opposite each other.

Figure 10:
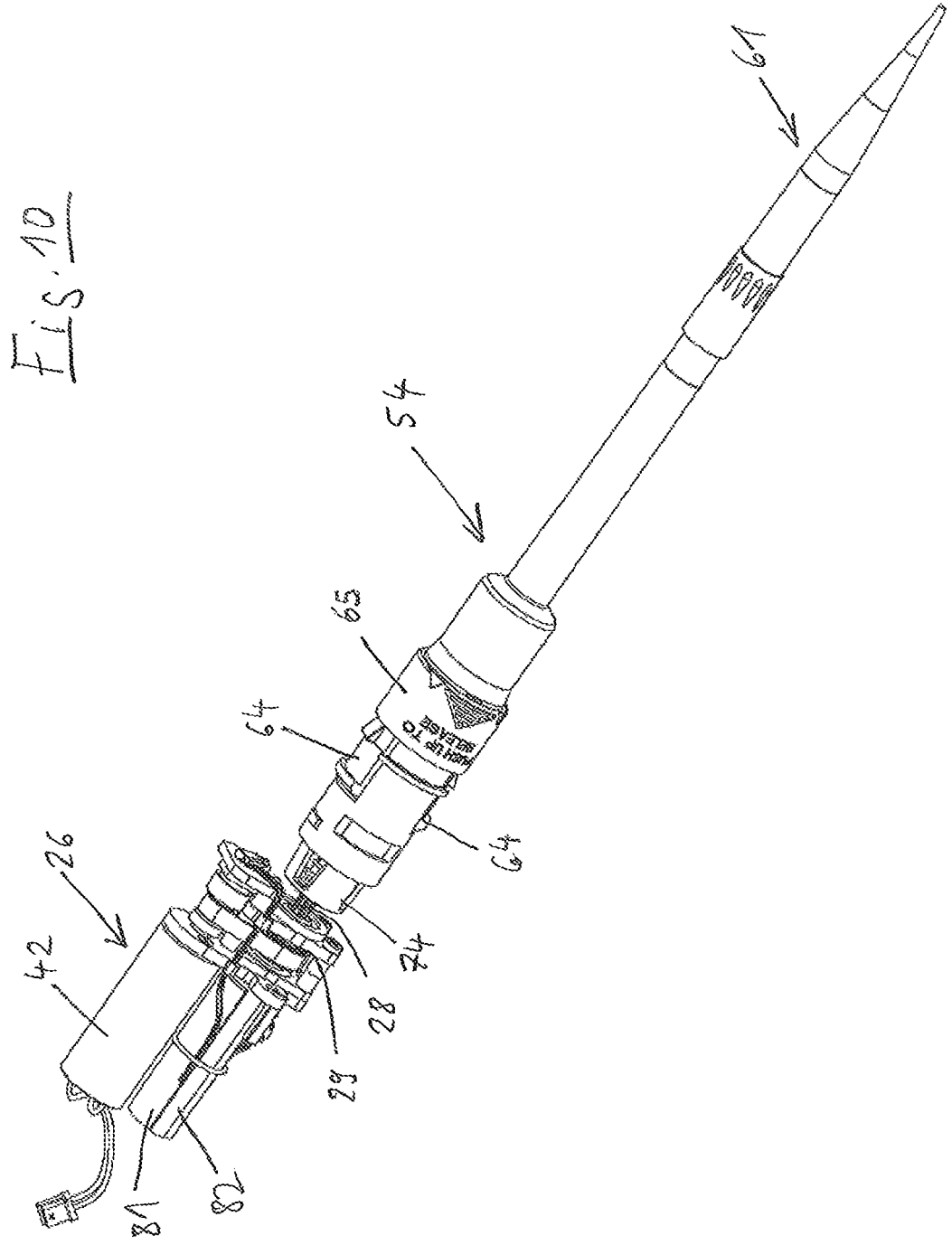
FIG. 10 shows the lower part of the same manual dosing device with dosing drive in a perspective view transversely from the side.

According to FIGS. 10 and 13, the threaded spindle 28 supports a sleeve-shaped guide element 83 on the upper end that has two guide noses 84 projecting to the outside that engage with the guide grooves 82. The guide element 83 is firmly connected to the threaded spindle 28. The guide element 83 linearly guides, for one, into the threaded spindle 28 in the guide cylinder 81 and hinders, for another, a twisting. As a result, the threaded spindle 28 is displaceable by rotating the spindle nut 29 in the longitudinal direction.

By applying current to the drive motor 42, the motor shaft 43 is rotated, the spindle nut 29 is set in rotation via the toothed belt 49, and the threaded spindle 28 is axially displaced. With the downward displacement of the threaded spindle 28 the plunger 56 is pushed farther into the cylinder 55, and with the upward displacement of the threaded spindle 28 it is displaced, since the disk 79 is held by the pretensioned helical spring 80 in abutment on the lower end of the threaded spindle 28. An air column is hereby displaced in the tube 68 that sucks liquid into or expels liquid from the pipette tip 61.

REFERENCE SIGN LIST

1 Electronic manual dosing device
2 Housing
3 Front housing hull
4 Rear housing hull
5 Selection wheel
6 Display
7, 8 Rocker switch
9, 10 Electrical contact
11 Power supply
12 Reset button
13 Curvature
14 Trigger button
15 Ejector button
16 Finger rest
17 First opening
18 First receiver
19 Receiving body
20 Second receiver
21 Second opening
22 Stop
23 Syringe gripping lever
24 Plunger gripping lever
25 Gear
26 Dosing drive
27 Spindle drive 28 Threaded spindle
29 Spindle nut
30.1, 30.2 First flattening
31 External thread
31.1, 31.2 Threaded area
32.1, 32.2 Guide rib
33.1, 33.2 Second flattening
34.1, 34.2, 34.3, 34.4 Guide area
35 Internal thread
36.1, 36.2 Thread profiles
37.1, 37.2 Flanks
38 Hollow shaft
39 Circular collar
40 Toothed belt wheel
41 Teeth
42 Drive motor
43 Motor shaft
44 Toothed belt wheel
45 Bearing bushing
46 Holding plate
47 Holder
48 Bearing eye
49 Toothed belt
50.1, 50.2 First guide element
51.1, 51.2 Second guide element
52 Control apparatus
53 Upper housing part
54 Lower housing part
55 Cylinder
56 Plunger
57 Truck section
58 Head section
59 Rocker button
60 Button
61 Pipette tip
62 Hollow space
63 Lower housing opening
64 Locking hook
65 Unlocking sleeve
66 Cylinder section
67 Hindering section
68 Tube
69 Seal seat
70 Connecting channel
71 Hole
72 Hole
73 Ejector sleeve
74 Closing cap
75 Cap casing
76 Cap bottom
77 Housing opening
78 Plunger rod
79 Disk
80 Helical spring
81 Guide cylinder
82 Guide groove
83 Guide element
84 Guide nose

We claim:

1. An electronic dosing drive comprising:
a threaded spindle (28) with an external thread (31) for driving a plunger (56) in a cylinder (55),
at least one first guide element (50.1, 50.2) firmly connected to the threaded spindle (28) that is guided parallel to the threaded spindle (28) on a second guide element (51.1, 51.2),
a spindle nut (29) with an internal thread (35) that is in engagement with the external thread (31) of the threaded spindle (28),
an electric drive motor (42) that has a motor shaft (43) coupled with the spindle nut (29),
an electric control apparatus (52) connected to the electric drive motor (42),
an electrical power supply (11) connected to the electric drive motor (42) and the electric control apparatus (52),
characterized in that
the external thread (31) of the threaded spindle (28) has multiple threaded areas (31.1, 31.2) that are separated from each other by first flattenings (30.1, 30.2) on their circumference extending in the longitudinal direction, and
the first flattenings (30.1, 30.2) have guide areas (34.1, 34.2, 34.3, 34.4) that abut the core diameter of the internal thread (35) of the spindle nut (29).

2. The dosing drive according to claim 1, in which the threaded spindle (28) is an injection molded part.

3. The dosing drive according to claim 2, in which the spindle nut (29) is produced from a second plastic and/or from a metal.

4. The dosing drive according to claim 3, in which the first plastic is a high-performance plastic or an engineering plastic and/or in which the second plastic is a high-performance plastic or an engineering plastic.

5. The dosing drive according to claim 1, in which the threaded spindle (28) is made of a first plastic, wherein the threaded spindle (28) is injection molded from the first plastic, or in which the threaded spindle (28) is made of a metal, wherein the threaded spindle is produced by means of MIM.

6. The dosing drive according to claim 1, in which the first flattenings (30.1, 30. 2) and support guide ribs (32.1, 32.2) have the guide areas (34.1, 34.2, 34.3, 34.4) on the outer ends.

7. The dosing drive according to claim 6, in which the support guide ribs (32.1, 32.2) have a second flattening (33.1, 33.2) on each end and, bordering the two side edges of the second flattening (33.1, 33.2), guide areas (34.1, 34.2, 34.3, 34.4) at a distance from the central axis of the threaded spindle (28) corresponding to half of the core diameter of the spindle nut (29).

8. The dosing drive according to claim 7, in which the first flattenings (30.1, 30.2) are planar surfaces and/or in which the second flattenings (33.1, 33.2) are planar surfaces.

9. The dosing drive according to claim 6, in which the outer edges of the support guide ribs (32.1, 32.2) and/or the transitions from the support guide ribs (32.1, 32.2) to the first flattenings (30.1, 30.2) are rounded.

10. The dosing drive according to claim 1, in which the threaded spindle (28) has only two first flattenings (30.1, 30.2) that are diametrically opposite each other, wherein said first flattenings have only two support guide ribs (32.1, 32.2) that are diametrically opposite each other.

11. The dosing drive according to claim 1, in which the threaded areas (31.1, 31. 2) of the external thread (31) taper between the first flattenings (30.1, 30.2) in the radial direction to the outside.

12. The dosing drive according to claim 1, in which the external thread 31 has thread profiles (36.1, 36.2) having outer edges delimited by the first flattenings (30.1, 30.2) are rounded off.

13. The dosing drive according to claim 12, the thread profiles (36.1, 36.2) having transitions of the flanks (37.1, 37.2) to the core of the threaded spindle (28) and/or the edges of the thread profiles (36.1, 36.2) arranged outside in the radial direction are rounded off.

14. The dosing drive according to claim 1, wherein the dosing drive is an electronic dosing device comprising an electronic dosing drive (26), a first receiver (18) for a syringe flange of a syringe cylinder of a syringe firmly arranged on the support structure, a receiving body (19) with a second receiver (20) for a plunger rod end of a syringe plunger of the syringe, wherein the receiving body (19) is firmly connected to a lower end of the threaded spindle (28).

15. The dosing drive according to claim 14, which is a manual dosing device (1) or is part of an automated dosing system or of an automated laboratory system.

16. The dosing drive according to claim 1, wherein the dosing drive is an electronic dosing device comprising at least one cylinder (55) in which the plunger (56) is arranged movably which is coupled with a lower end of the threaded spindle (28), at least one seal seat (69) for firmly clamping and sealing a pipette tip (61), and at least one connecting channel (70) that connects a hole (72) in the seal seat (69) to the cylinder (55).

17. The dosing drive according to claim 16, which is a single-channel dosing device or a multi-channel dosing device.

\* \* \* \* \*